United States Patent [19]

Takao et al.

[11] Patent Number: 4,847,132
[45] Date of Patent: Jul. 11, 1989

[54] PROTECTIVE LAYER FOR OPTICAL INFORMATION RECORDING MEDIUM

[75] Inventors: Masatoshi Takao, Osaka; Kunio Kimura, Hirakata; Toshimitsu Kurumizawa, Suita; Kenichi Nagata, Neyagawa, all of Japan

[73] Assignee: Matsushita Electric Industrial Co., Ltd., Osaka, Japan

[21] Appl. No.: 108,649

[22] Filed: Oct. 15, 1987

[30] Foreign Application Priority Data

Oct. 20, 1986 [JP] Japan .................................. 61-248608
Apr. 17, 1987 [JP] Japan .................................. 62-95630

[51] Int. Cl.⁴ ............................................... B32B 3/02
[52] U.S. Cl. ......................................... 428/64; 428/65; 428/137; 428/688; 428/913; 428/215; 428/216; 428/698; 428/704; 428/323; 428/331; 369/283
[58] Field of Search ..................... 369/283; 430/495; 428/64, 65, 137, 688, 913, 215, 216, 323, 331, 698, 704; 346/76 L, 135.1

[56] References Cited

U.S. PATENT DOCUMENTS 3,971,874  7/1976  Ohta et al. .......................... 428/432
4,322,839  3/1982  Yamashita et al. ................. 369/122
4,405,706  9/1983  Takahashi et al. ................. 430/271
4,529,688  7/1985  Law et al. ........................... 430/494

FOREIGN PATENT DOCUMENTS 0047733  4/1977  Japan .................................. 428/913
0109695  7/1982  Japan .................................. 428/913

Primary Examiner—Ellis P. Robinson
Assistant Examiner—P. J. Ryan
Attorney, Agent, or Firm—Stevens, Davis, Miller & Mosher

[57] ABSTRACT

A protective layer which is applied to rewritable optical information recording medium comprising a substrate and a photosensitive thin film. When exposed to optical energy, the thin layer is capable of undergoing a reversible phase change by which an optical reflectivity is changed between two states. The protective layer is inhibiting the thermal damages of the substrate during light irradiation and also controlling thermal and optical boundary conditions. The protective layer is made of the mixture of mutually solid insoluble materials. The typical choice of the mixture of small crystalline grains of ZnS and noncrystalline $SiO_2$.

20 Claims, 7 Drawing Sheets

PROTECTIVE LAYER FOR OPTICAL INFORMATION RECORDING MEDIUM

BACKGROUND OF THE INVENTION

1. FIELD OF THE INVENTION

This invention relates to a heat-resistant protective layer for a reversible optical information storage medium of a phase change type which can record, reproduce, erase and rewrite information with a laser beam.

2. DESCRIPTION OF RELATED ART

In an erasable, repeatedly recordable/reproducible and non-volatile optical information recording medium, for example, an optical disk memory including a phase change type or magneto-optical type one, a substrate is made of a plastics. In order to avoid the damage of the plastic substrate by heating with laser, it has been proposed to provide a heat-resistant protective film of an inorganic material such as oxides between the substrate and an optically active layer, on the optically active layer or on both the sides of the optically active layer (hereinafter referred to as the "active layer"). As materials for the heat-resistant protective layer are known oxides such as $SiO_2$, $GeO_2$, $Al_2O_3$ and $BeO_2$, nitrides such as BN, $Si_3N_4$, AlN, carbides such as SiC, and chalcogenides such as ZnS and ZnSe. Main properties required for the heat-resistant protective layer are that (1) the layer is transparent in a wavelength range used,
(2) the melting point of the layer is higher than an operation temperature,
(3) the layer has a high mechanical strength,
(4) the layer is chemically stable, and
(5) the layer has a suitable thermal constant such as thermal conductivity and specific heat.

The requirement (1) above is clearly necessary for the highly effective absorption of laser energy in the active layer; the requirement (2) is important because the heat-resistant layer is inconveniently changed before the active layer reaches the thermal transformation temperature, if the requirement (2) is not satisfied; the requirement (3) above is necessary to prevent the protective layer from being broken during the heating or cooling thereof; the requirement (4) is essential to avoid the hydrolyzation or deliquescence of the layer with moisture; and finally the lack of the requirement (5), i.e., an improper thermal constant causes the laser energy to be utilized with reduced efficiency, in the optical information recording medium, particularly the phase change type one which changes reversibly between the two phases thereof by quenching and annealing in combination for recording and erasing. Such an optical information medium having an improper thermal constant is insufficiently sensitive to laser irradiation power, that is, it requires higher laser irradiation power for recording and erasing.

SUMMARY OF THE INVENTION

The object of this invention is to provide a phase change type information recording medium capable of recording, reproducing, erasing and rewriting information with a laser beam, which medium has an improved recording-erasing property, i.e., improved cyclability of recording and erasing, with a thermal constant controlled while restraining the outstanding thermal deformation to the minimum.

The phase change type information recording medium according to this invention has a substrate, an active layer on the substrate and a heat-resistant protective layer between the substrate and the active layer or on the active layer, and this heat-resistant protective layer is made of a mixture of a plurality of compounds, at least two of which do not form any solid solution with each other.

DETAILED DESCRIPTION OF PREFERRED EMBODIMENTS

This invention will be illustrated by some embodiments with reference to the drawings attached hereto.

Figure 1:
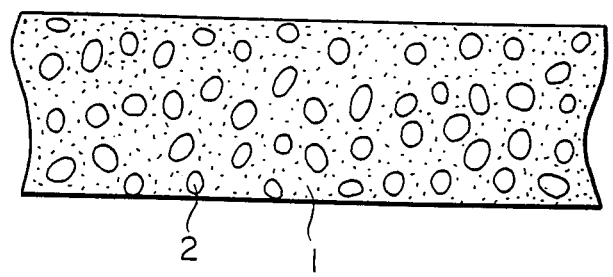
FIG. 1 is a pictorial view of the inner structure of the heat-resistant thin layer according to this invention.
Figure 2:
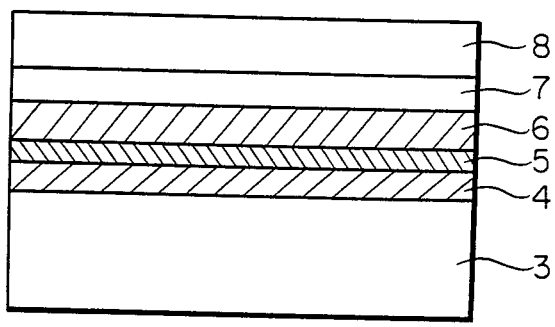
FIG. 2 is a schematical cross-sectional view of the optical information recording medium according to an embodiment of this invention.

FIG. 1 schematically shows the microscopic structure of the heat-resistant protective layer according to this invention. This structure comprises a glassy matrix containing crystallite dispersed therein. FIG. 2 is a schematical cross-sectional view of the essential part of the optical information recording medium according to this invention. This part comprises a substrate 3, heat-resistant protective layers 4 and 6, an optical active layer 5 and a protective substrate 8 which is adhered to the heat-resistant protective layer by an adhesive layer 7. This invention is featured by materials specified for the heat-resistant protective layers 4 and 6. That is, conventional materials such as germanium dioxide ($GeO_2$), silicon dioxide ($SiO_2$) and zinc sulfide (ZnS) do not provide any sufficient mechanical strength and thermal properties.

A heat-resistant protective layer having a poor mechanical strength at a high temperature, may be broken due to thermal deformation when laser irradiated, and further a heat-resistant protective layer having many structural defects, may be shrunk by heat to permanent deformation. With the thermal properties, the protective layer should have a proper thermal conductivity and specific heat, in order to effectively utilize the thermal energy of laser. If the thermal conductivity is too high, an extra amount of energy is inconveniently required. If the thermal conductivity is too low, the desired quenching conditions are not satisfied. The quenching conditions are important to the phase change type optical information recording media, because such media records and erases information by reversible transformation from one phase to another and vice versa with the combination of heating and quenching or annealing.

The feature of this invention is to improve the recording-erasing cyclability of an optical information recording medium by controlling the thermal constant of the medium while maintaining the high-temperature mechanical properties at a good level or restraining the outstanding thermal deformation to the minimum and further to improve recording-erasing cyclability. As actual conditions for designing the protective layer it is desired that the protective layer has a high efficiency of optical absorption for laser. For this, incident laser light is necessary to satisfy an antireflection condition. An active layer containing tellurium as a principal constituent has a refractive index of about 4. In order to obtain the antireflection condition, the refractive index of the heat-resistant protective layer should be less than about 4, and calculation reveals that the refractive index between 2 and 3 achieves optimum antireflection condition. The antireflection condition is approximately expressed by the following equation:

$$d = L/4N$$

wherein N is the refractive index of the protective layer, L the wavelength of a laser and d the thickness of the protective layer. A typical material satisfying the equation above is zinc sulfide (ZnS: $N = 2.3$).

As mentioned above, however, ZnS is excellent in the initial characteristics but it was found according to the inventors' experiments that the recording-erasing cyclability was not satisfied. Therefore, the inventors tried to improve this cyclability. As a result, they have found that a mixture of zinc sulfide and silicon dioxide has an excellent cyclability. Further inventors' experiments have revealed that materials exhibiting novel characteristics can fundamentally be obtained by quenching or vapor depositing two mutually solid-insoluble components to produce a thin film constituted by uniformly finely divided and intimately mixed particles, which look as if they are forcibly formed to be a solid solution. These components of the materials are featured by being mutually solid insoluble, as mentioned above. The combination of these mutually solid-insoluble components is one of a glassy component and a crystalline component. The crystalline component is a chalcogenide such as a zinc chalcogenide such as ZnS, ZnSe or ZnTe, or a lead chalcogenide such as PbS. The glassy material is an oxide glass such as silicon dioxide or germanium dioxide, or a non-oxide glass such as silicon nitride or silicon carbide.

It has not yet been clear why the combination of the crystalline constituent and the glassy constituent brings about the desired effect of this invention. Perhaps it appears that the presence of the glassy constituent inhibits the growth of the crystalline constituent as microstructural unit (grain or crystal grain) in the thin film, so that the crystalline constituent is refined or made amorphous, and that the thin film of such refined crystalline or amorphous component has a low thermal conductivity and hence applied laser energy contributes to the efficient increase in the temperature of the active layer.

The average size of the above-mentioned microstructural unit is preferred to be smaller, and it is most preferably as small as not observed by an X-ray diffraction method. In this invention, the microstructural unit means a size which can be observed as a crystallite under a transmission electron microscope (TEM), i.e., a size (diameter) of grains observed from the diffraction image of crystals. The grain size described below all were determined in the above-mentioned manner. The actual effect of this invention can be obtained at a grain size of 10 nm or less, preferably 5 nm or less.

If the laser power is effectively absorbed into the active layer, a less amount of the laser power irradiated is satisfactory. This means that the ambient temperature of the active layer is not raised when recorded and erased. Conclusively, the thermal damage of the active layer and the heat-resistant protective layer is reduced and the recording-erasing cyclability are increased, which means that the cyclability of the optical information recording medium are improved by this invention. Therefore, the lower laser power required for recording and erasing is essential to the increase in the cyclability.

It has already been confirmed that the number of recording-erasing cycles on a static tester is at least $10^6$ for a medium having a heat-resistant protective layer, which is improved in the recording and erasing sensitivity unless otherwise indicated in the examples below.

Generally, a chalcogenide has a great refractive index, i.e., it can satisfy the requirement of $N > 2$. Many oxide glasses have a refractive index of at most 2. Therefore, it is generally understandable that the forced admixing of an excessive amount of the glassy constituent to the chalcogenide has an adverse effect on the characteristics of the medium, but it has been found that a moderate amount can give conspicuously improved characteristics.

This invention will be illustrated below with reference to some examples.

EXAMPLE 1

Figure 3:
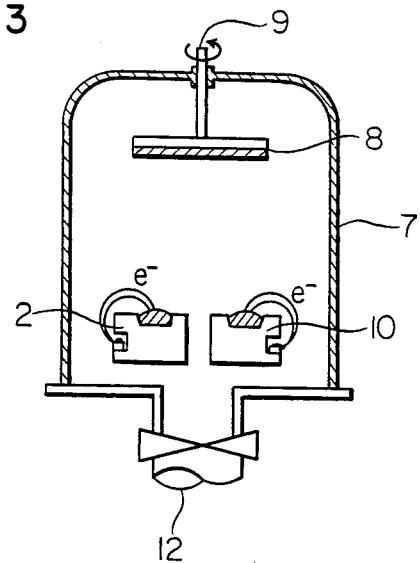
FIG. 3 is a schematical cross-sectional view of a vacuum evaporation apparatus for forming the active layer and the heat-resistant protective layer.

A heat-resistant protective layer comprising a mixture of zinc sulfide (ZnS) and silicon dioxide ($SiO_2$) was formed by the binary-source deposition system on a substrate of polymethyl methacrylate (PMMA). The schematical view of an evaporation apparatus used in this example is shown in FIG. 3. The reached vacuum degree was in order of $10^{-6}$. A vacuum chamber 7 was evacuated at an evacuation vent 12. A substrate 8 was rotated by a rotating axis 9. Evaporation of the components, zinc sulfide and silicon dioxide were carried out at evaporation sources 10 and 11. The mixing ratio of zinc sulfide and silicon dioxide was determined by controlling the evaporated amounts of the respective components, and qualitative chemical analysis was carried out. As the material of the active layer was used a TeGeSnO system compound, which is one of the phase change type materials which is recordable and erasable by changing from the crystalline phase to the amorphous phase and vice versa. The thickness of the active layer was 100 nm. The heat-resistant protective layers were formed both between the active layer and the substrate and on the active layer. The protective layers had a thickness of 100 and 200 nm, respectively. These thicknesses were decided in view of a laser absorption efficiency and a great change in the optical constant.

Figure 4:
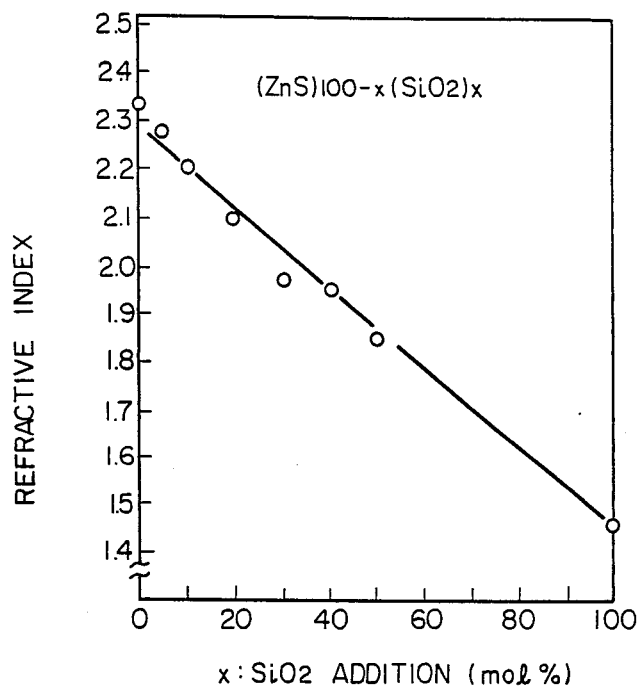
FIG. 4 is a graph showing the refractive index of a $ZnS+SiO_2$ system.

FIG. 4 shows a relationship between the mixing ratio (x) of $SiO_2$ and the refractive index of the heat-resistant protective layer itself. This shows that the refractive index is nearly linearly reduced as the addition of $SiO_2$ to ZnS is increased. This means that ZnS and $SiO_2$ are not bonded to each other but simply mixed. The same relationship can be seen in combinations other than that of ZnS and SiO$_2$, which are described in the examples below.

Table 1 represents the relationship between the addition of SiO$_2$ and the minimum power required for crystallization (erasing) and amorphization (recording). Table 1 also shows the average grain size of ZnS determined by the transmission electron microscope.

This determination was dynamically carried out by rotating a disk at a peripheral speed of about 5 m/sec. A laser used had a wavelength of 830 nm and its beam was focused on the disk to the diffraction limit. The laser power was as small as possible, in order to diminish the load on the disk.

TABLE 1
Effect of Addition of SiO$_2$ to ZnS

| Amount of SiO$_2$ (mol %) | Minimum Laser Power (mW) Recording | Erasing | Grain Size (nm) |
|---|---|---|---|
| 0 | 9 | 14 | 30 |
| 5 | 9 | 14 | 30 |
| 10 | 7.5 | 12.5 | 10 |
| 20 | 6 | 12 | 5 |
| 30 | 6 | 12 | 5 |
| 40 | 8.5 | 13 | <5 |

From Table 1 it is seen that when the amount of SiO$_2$ added is 10 to 30 mol %, the grain size is 10 nm, which reveals that there was effectiveness. The addition of SiO$_2$ to ZnS allows the minimum power required for crystallization and amorphization to be reduced, and further addition allows the power to be again raised. This shows that there is an optimum amount of SiO$_2$ added. In this example, it is seen that when the amount of SiO$_2$ added is between 10 and 30 mol %, the laser power required for crystallization is 6 to 7.5 mW, which is lower than the power (9 mW) required in the case free of SiO$_2$. At this amount added, the refractive index is about 2 or more, which satisfies the above-mentioned optical requirement.

As is clear from the above, the addition of SiO$_2$ to ZnO is effective to reduce the laser power required for crystallization.

Figure 5:
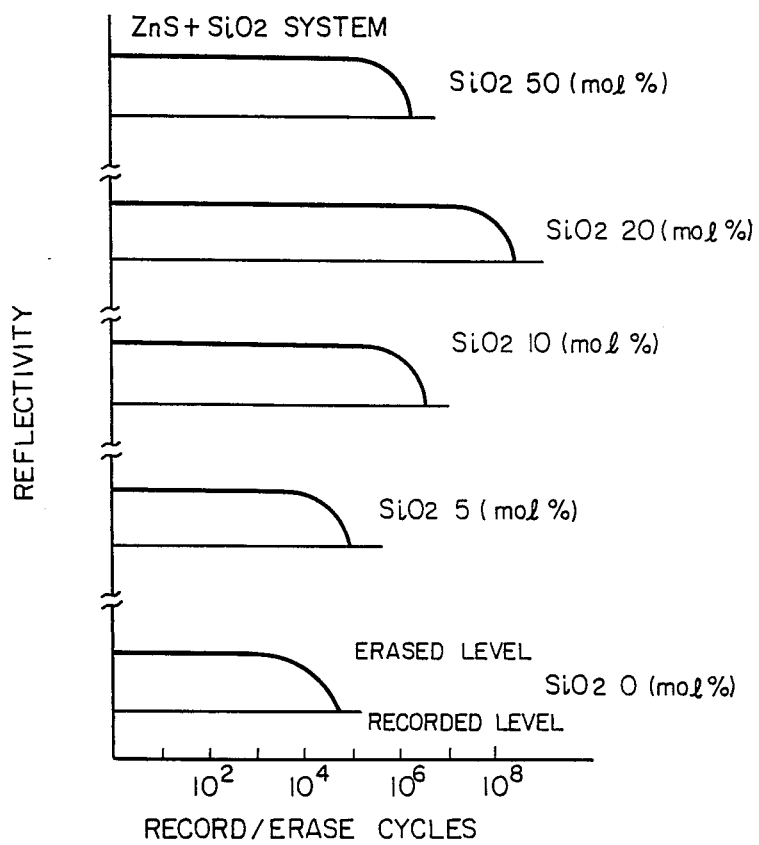
FIG. 5 is a graph showing the recording-erasing cyclability of the $ZnS+SiO_2$ system.

FIG. 5 shows a change in the reflectivity on recording and erasing cycles by using a static tester. In FIG. 5, there are five pairs of curves, each of which pairs has the upper curve corresponds to crystallized state, i.e., erased state and the lower curve corresponds to an amorphized state, i.e., recorded state. A difference in the reflectivity is in proportion to the intensity of signals to be recorded. From FIG. 5, it is seen that the addition of SiO$_2$ causes the number of recording-erasing cycles to be changed. The laser power was determined so as to simulate the thermal load in the disk.

The projection of a laser power distribution on the disk was adjusted so that it was in a circular shape for recording and in an ellipsoidal shape for erasing.

In this case, it is also seen that the best result was obtained when the amount of SiO$_2$ added was 20 mol %, and that it is possible to repeat recording-erasing cycles $10^6$ times.

In this example, SiO$_2$ and ZnO were forcibly dispersed and mixed by quenching from their vapor phases to achieve the desired characteristics. However, annealing from the same vapor phases, for example, at an extremely low deposition rate, prevents the dispersion and accelerates phase separation, thereby not improving the sensitivity as well as not increasing the number of recording-erasing cycles. This is the same as in the examples described below.

EXAMPLE 2

A heat-resistant protective layer comprising a mixture of zinc selenide (ZnSe) and silicon dioxide (SiO$_2$) was formed by the binary-source deposition system on a substrate of polymethyl methacrylate. The reached vacuum degree was in order of $10^{-6}$. The mixing ratio of zinc selenide and silicon dioxide was decided by controlling the evaporated amounts of the respective materials in the same manner as in EXAMPLE 1. The quantitative chemical analysis was carried out. As the material of the active layer was used the same TeGeSnO system compound as in EXAMPLE 1. The thickness of the active layer was 100 nm. The heat-resistant protective layers were provided on the active layer at both the substrate side and the opposite side thereof with thicknesses of 100 and 200 nm, respectively.

Figure 6:
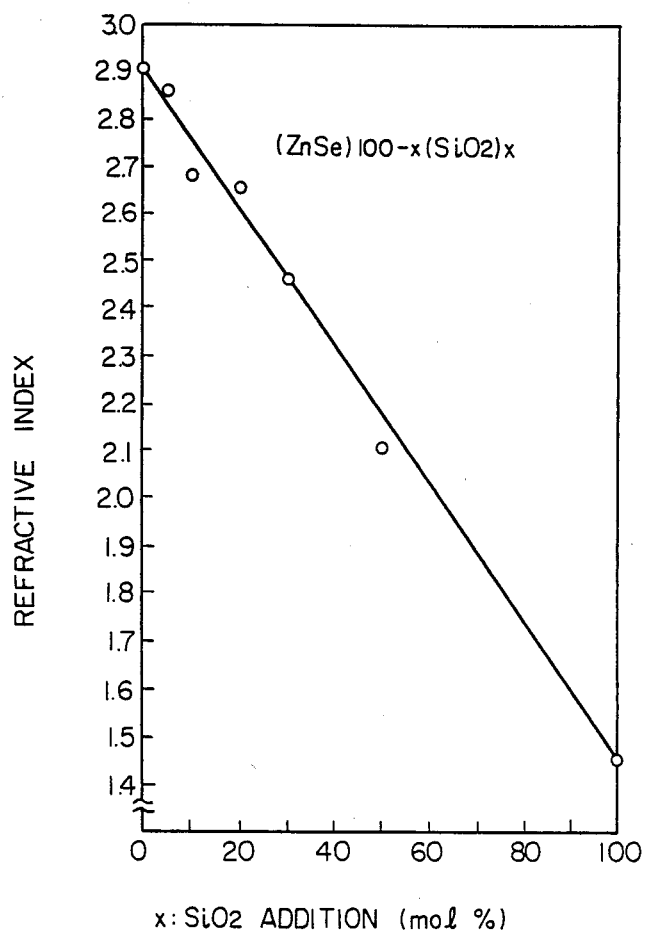
FIG. 6 is a graph showing the refractive index of the $ZnS+SiO_2$ system.

FIG. 6 represents a relationship between the refractive index and the amount (x) of SiO$_2$ added of the heat-resistant protective layer itself. It is clear from FIG. 6 that the refractive index is nearly linearly decreased as the amount of SiO$_2$ to ZnSe is increased.

Table 2 shows the relationship between the amount of SiO$_2$ added and the minimum laser power required for the crystallization and amorphization. The measurement method was the same as in EXAMPLE 1.

TABLE 2
Effect of Addition of SiO$_2$ to ZnSe

| Amount of SiO$_2$ (mol %) | Minimum Laser Power (mW) Recording | Erasing |
|---|---|---|
| 0 | 9 | 14 |
| 10 | 9 | 14 |
| 15 | 7.5 | 13 |
| 25 | 6 | 12 |
| 35 | 6 | 11.5 |
| 50 | 8.5 | 13.5 |

The addition of SiO$_2$ to ZnSe allows the laser power required for the crystallization and amorphization to be reduced and further addition allows the laser power to be increased, as in EXAMPLE 1. As is seen from the results that there is an optimum amount of SiO$_2$ added.

In this example, it is understood that if the amount of SiO$_2$ added is 15 to 35 mol %, the laser power required for the crystallization is in the range of 6 to 7.5 mW, which is lower than that of the layer free of SiO$_2$ (9 mW).

As is clear from the above, the addition of SiO$_2$ to ZnSe can achieve the effect of reducing the laser power required for the crystallization and amorphization. This heat-resistant protective layer withstood 106 recording-erasing cycles on a static tester, as in EXAMPLE 1.

EXAMPLE 3

A heat-resistant protective layer comprising a mixture of a zinc chalcogenide, i.e., zinc sulfide (ZnS), zinc selenide (ZnSe) or zinc telluride (ZnTe) with any glassy oxide of germanium dioxide (GeO$_2$), tin oxide (SnO$_2$), indium oxide (In$_2$O$_3$) and tellurium dioxide (TeO$_2$) was formed by the binary-source deposition system on a substrate of polymethyl methacrylate. The mixing ratio of the zinc chalcogenide (ZnX:X is a chalcogen) and the glassy oxide was decided by controlling the respective amounts of the materials evaporated. The quantitative chemical analysis was also carried out. As the material for the active layer was used the same TeGeSnO system compound as in EXAMPLE 1. The thickness of the active layer was 100 nm. The heat-resistant protective layers were provided on the active layer at both the substrate side and the opposite side thereof, in thicknesses of 100 nm and 200 nm, respectively.

Table 3 shows the relationship between the amount of the oxide added and the minimum laser power required for the crystallization and amorphization. The measurement method was the same as in EXAMPLE 1.

The addition of the glassy oxide to zinc chalcogenide allows the minimum laser power required for the crystallization to be reduced, and further addition allows the minimum power to be increased again. From this it is clear that there is an optimum amount of the glassy oxide added.

In this example, it is seen that when the amount of $SnO_2$ added was in the range of 15 to 35 mol %, the laser power required for the crystallization was in the range of 6 to 7 mW, which was lower than that of the protective layer free of the $SnO_2$ (9 mW). Furthermore, it is seen that the laser power required for the amorphization was reduced.

Substantially the same results were obtained for the combinations of the two other chalcogenides and the oxide.

TABLE 3

Effect of Addition of $GeO_2$ to ZnS

| Amount of $GeO_2$ (mol %) | Minimum Laser Power (mW) | |
|---|---|---|
| | Recording | Erasing |
| 0 | 9 | 14 |
| 5 | 9 | 14 |
| 10 | 7 | 13 |
| 20 | 6 | 12 |
| 30 | 6 | 12 |
| 40 | 7.5 | 13 |

EXAMPLE 4

A heat-resistant protective layer comprising a mixture of zinc sulfide and glassy silicon nitride ($Si_3N_4$) was formed by the binary-source deposition system on a substrate of polymethyl methacrylate. The mixing ratio of zinc sulfide and glassy silicon nitride was decided by controlling the evaporated amounts of the respective materials in the same manner as in EXAMPLE 1. The quantitative chemical analysis was carried out. The active layer was made of the same material as used in EXAMPLE 1, TeGeSnO. The thickness of the active layer was 100 nm. The heat-resistant protective layers were provided on the active layer at both the substrate side and the opposite side thereof, in thicknesses of 100 and 200 nm, respectively.

Table 4 shows a relationship between the amount of $Si_3N_4$ added and the minimum laser power required for the crystallization and amorphization.

TABLE 4

Effect of Addition of $Si_3N_4$ to ZnS

| Amount of $Si_3N_4$ (mol %) | Minimum Laser Power (mW) | |
|---|---|---|
| | Recording | Erasing |
| 0 | 9 | 14 |
| 5 | 9 | 14 |
| 10 | 7.5 | 12.5 |

TABLE 4-continued

Effect of Addition of $Si_3N_4$ to ZnS

| Amount of $Si_3N_4$ (mol %) | Minimum Laser Power (mW) | |
|---|---|---|
| | Recording | Erasing |
| 20 | 6 | 12 |
| 35 | 6.5 | 12.5 |
| 40 | 8.5 | 14 |

Figure 7:
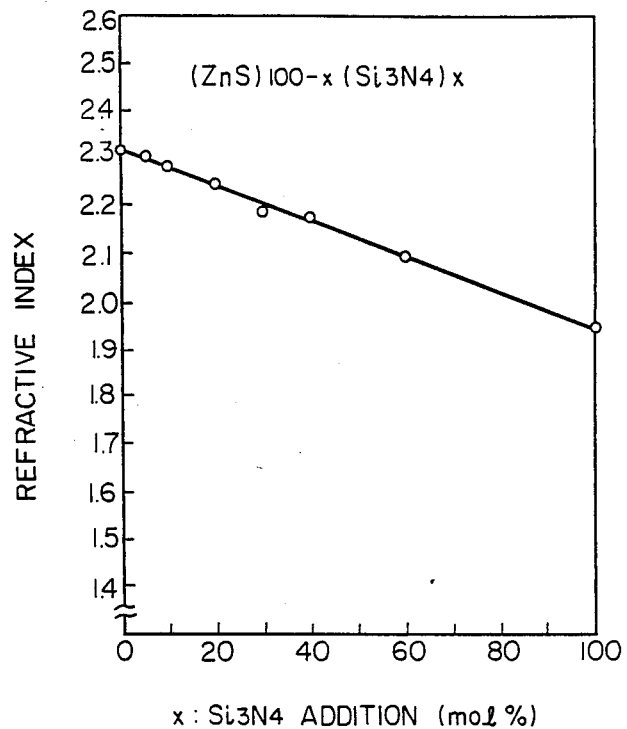
FIG. 7 is a graph showing the refractive indices of the $ZnS+Si_3N_4$ system

FIG. 7 shows a relationship between the amount of $Si_3N_4$ added and the refractive index of the heat-resistant protective layer itself obtained in this example. From FIG. 7 it is clear that the refractive index is nearly linearly reduced as the amount of $Si_3N_4$ added to ZnS is increased. In this example, it was confirmed that the minimum laser power required for the crystallization and amorphization was reduced by adding $Si_3N_4$ to ZnS in the heat-resistant protective layer. This reveals that there is an optimum value in the amounts of $Si_3N_4$ added to ZnS. That is, the optimum value is about 20 mol %.

EXAMPLE 5

Figure 8:
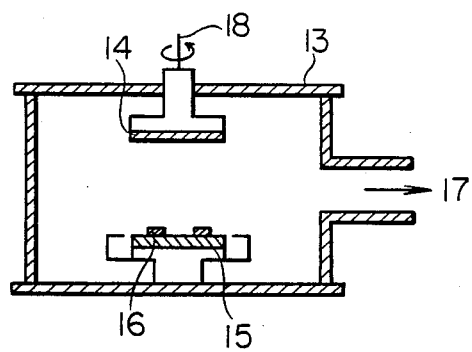
FIG. 8 is a schematical cross-sectional view of a sputtering apparatus used in this invention.
Figure 9:
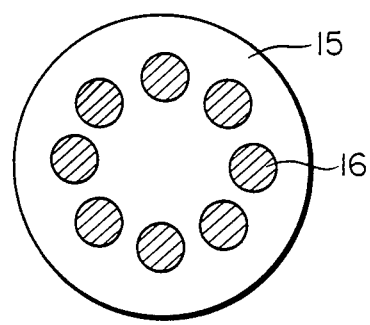
FIG. 9 is a schematical cross-sectional view of a structure of a cathode target.

A heat-resistant protective layer comprising a mixture of zinc selenide and glassy silicon carbide (SiC) was formed by the sputtering method on a substrate of polymethyl methacrylate. FIG. 8 shows a schematical view of a sputtering apparatus used in this example, and FIG. 9 shows the structure of a cathode target used in the sputtering apparatus. In FIGS. 8 and 9, reference numbers 13, 14, 15, 16, 17 and 18 are a vacuum chamber, substrate, cathode material, adjusting cathode material, evacuation vent and rotating axis, respectively. The adjusting cathode materials were arranged in a mosaic form for adjusting the composition to be sputtered. This sputtering apparatus was commercially available. The cathode target was of a composite type. That is, a sintered body of ZnSe and sintered pellets of SiC on the sintered body in a desired mixing ratio thereof were sputtered. The quantitative chemical analysis was carried out. The active layer was made of the same TeGeSnO as used in EXAMPLE 1. The thickness of the active layer was 100 nm. The heat-resistant protective layers were provided on the active layer at the substrate side and the opposite side thereof, in thicknesses of about 100 and 200 nm, respectively.

This example also confirmed that the addition of SiC to ZnSe reduced effectively the minimum laser power required for the crystallization and amorphization. The optimum amount of SiC to ZnSe was about 20 mol %.

EXAMPLE 6

A heat-resistant protective layer comprising a mixture of zinc sulfide, silicon dioxide and germanium dioxide was provided by a ternary-source deposition system on a substrate of polymethyl methacrylate. The content of zinc sulfide was constant (15, 20 and 50 mol %) and the amounts of silicon dioxide and germanium dioxide added were changed. The respective effects were measured. The mixing ratios thereof were decided by controlling the evaporated amounts of the respective materials. The quantitative chemical analysis was carried out. The active layer was made of the same TeGeSnO as used in EXAMPLE 1. The thickness of the active layer was 100 nm. The heat-resistant protective layers were formed on the active layer at both the substrate side and the opposite side thereof in thicknesses of 100 and 200 nm, respectively.

Figure 10:
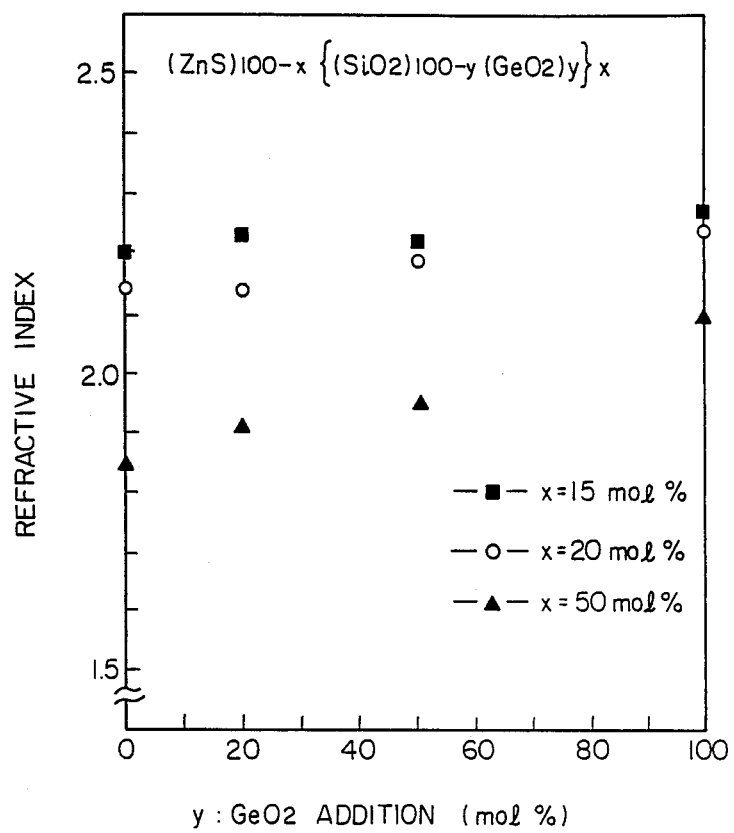
FIG. 10 is a graph showing the refractive index of the $ZnS+SiO_2+GeO_2$ system.
Figure 11:
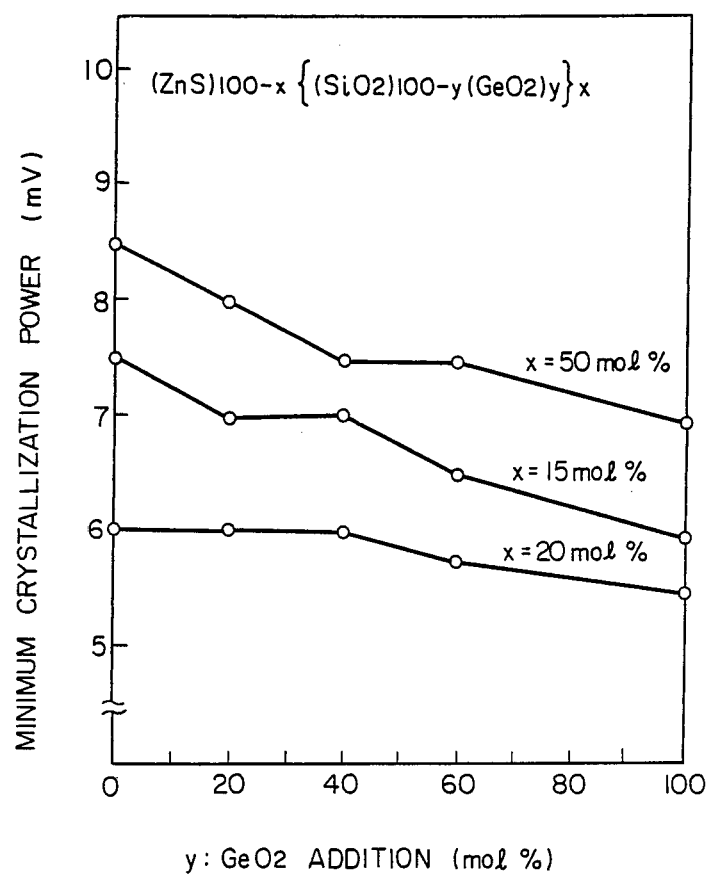
FIG. 11 is a graph showing the refractive index of the $ZnS+SiO_2+GeO_2$ system.

FIG. 10 shows a relationship between the amounts of $SiO_2$ and $GeO_2$ added and the refractive index of the protective layer. From FIG. 10 it is seen that as the amount of a mixture of $SiO_2$ and $GeO_2$ to ZnS is increased, the refractive index is nearly linearly decreased. FIG. 11 shows a relationship between the total amount of the glassy oxides added and the minimum laser power required for the crystallization. The minimum laser power was reduced to the lowest level, i.e., 6 mW when the total amount was about 20 mol %. The laser power for the amorphization was 2 mW reduced. The measurement method was the same as used in EXAMPLE 1.

EXAMPLE 7

A heat-resistant protective layer comprising a mixture of a lead chalcogenide (PbS, PbSe and PbTe) and silicon dioxide was provided by the binary-source deposition system on a substrate of polymethyl methacrylate. The reached vacuum degree was in order of $10^{-6}$. The mixing ratios of the lead chalcogenide and silicon nitride were decided by controlling the evaporated amounts thereof, as in EXAMPLE 1. The quantitative chemical analysis was carried out. The active layer was made of the same TeGeSnO as used in EXAMPLE 1 and the thickness of the active layer was 100 nm. The heat-resistant protective layers were provided on the active layer at the substrate side and the opposite side thereof in thicknesses of about 100 and 200 nm, respectively.

Figure 12:
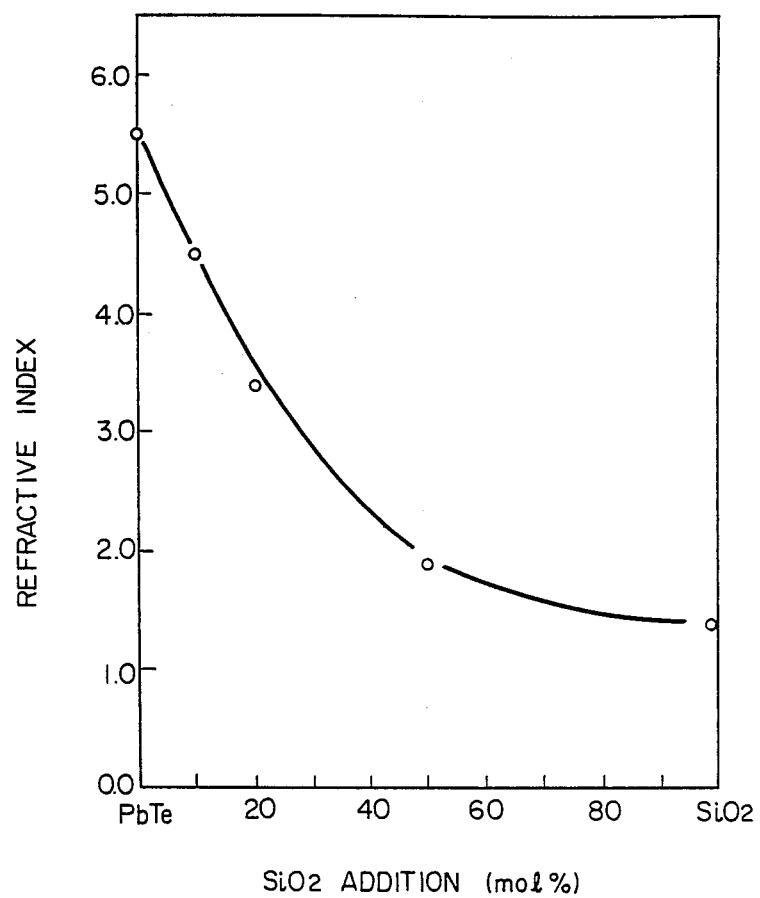
FIG. 12 is a graph showing the refractive index of the $PbTe+SiO_2$ system.

FIG. 12 shows a relationship between the amount of $SiO_2$ added to PbTe and the refractive index of the heat-resistant protective layer. From FIG. 12 it is seen that as the amount of $SiO_2$ added is increased, the refractive index is nearly monotonously reduced. The minimum laser power required for the crystallization and amorphization was measured in the same manner as in EXAMPLE 1. It was reduced with the lead chalcogenide but the extent of the reduction in the minimum laser power was smaller than that with the zinc chalcogenide. This example also confirmed that there was the optimum amount of $SiO_2$ added, but this effect with the lead chalcogenide was smaller than that with the zinc chalcogenide. The reason therefor is considered that the lead chalcogenide has a slight amount of absorption at a wavelength of semiconductor laser.

EXAMPLE 8

A heat-resistant protective layer comprising a mixture of zinc selenide (ZnSe) and silicon dioxide ($SiO_2$) was provided by the binary-source deposition system on a substrate of a polycarbonate. The reached vacuum degree was in order of $10^{-6}$. The mixing ratio of zinc sulfide and silicon dioxide was decided by controlling the evaporated amounts of the respective materials, as in EXAMPLE 1. The quantitative chemical analysis was carried out. The active layer was made of TbFeCo for magneto-optical media. The thickness of the active layer was 50 nm. The heat-resistant protective layers were formed on the magneto-optically active layer at both the substrate side and the opposite side thereof in thicknesses of about 100 and 200 nm, respectively. The resultant heat-resistant protective layers were similar to those of EXAMPLE 2. Table 5 shows the relationship between the amount of $SiO_2$ added and the oxidation resistance of the protective layers. In the case of ZnS alone, the reflectivity thereof was reduced after a few days, but the ZnS having $SiO_2$ added hereto was not reduced even after 30 days.

TABLE 5

| | Addition of $SiO_2$ and Oxidation | |
|---|---|---|
| Amount of $SiO_2$ (mol %) | Change in Reflectivity (%) | |
| | After 3 days | After 30 days |
| 0 | −20 | *** |
| 10 | −5 | −35 |
| 20 | 0 | −5 |
| 30 | 0 | −6 |

As is seen in the examples described above, this invention is effective in improving the characteristics of the optical information recording medium. Particularly, this invention is highly effective at the points that the incident laser power is effectively utilized, that the cyclability of recording-erasing is increased, and that the active layer is protected from oxidation. Thus, this invention is advantageous in improving the cyclability of the optical information recording medium.

The examples above reveal that a crystalline material such as zinc sulfide and a glassy material such as silicon dioxide were quenched from the vapors thereof to form a thin layer comprising finely divided particles which look as if they are forcibly allowed to form a solid solution. This concept is novel over prior art.

EXAMPLE 9

In EXAMPLE 1, $SiO_2$ and ZnS were forcibly dispersed and mixed by the quenching of vapors or vapor deposition, in which the deposition rate was 1 nm/sec. On the other hand, annealing from the same vapor phases at an extremely low deposition rate causes an average grain size of ZnS to be too great for the ZnS grains to be dispersed and the phase separation to be accelerated, thereby not improving the sensitivity of recording and erasing as well as not increasing the number of recording-erasing cycles. In order to confirm this cause, the degree of dependency of the sensitivity of the laser power to recording and erasing upon the vapor deposition rate at an amount of $SiO_2$ added being 25 mol % was measured. The results are reported in Table 6.

TABLE 6

| Vapor Deposition Rate, Grain Size and Sensitivity of Laser Power to Recording and Erasing | | | |
|---|---|---|---|
| Deposition Rate (nm/sec) | Grain Size (nm) | Minimum Laser Power | |
| | | Recording (mW) | Erasing (mW) |
| 3 | <5 | 5.5 | 12 |
| 2 | 5 | 6 | 12 |
| 1 | 5 | 6 | 12 |
| 0.5 | 10 | 6.5 | 13 |
| 0.2 | 15 | 8 | 14 |
| 0.1 | 30 | 9 | 14 |

From Table 6 it is seen that when the grain size is great, the laser power is excessively required, which means that the sensitivity is poor. Furthermore, it is clear that the grain size should be 10 nm. These are common to the following examples.

EXAMPLE 10

A heat-resistant protective layer comprising a mixture of zinc selenide (ZnSe) and silicon dioxide ($SiO_2$) was provided by the binary-source deposition system on a substrate of polymethyl methacrylate. The reached vacuum degree was in order of $10^{-6}$. The mixing ratio of zinc selenide and silicon dioxide was decided by controlling the evaporated amounts of the respective materials. The quantitative chemical analysis was carried out. The active layer was made of the same TeGeSnO as used in EXAMPLE 1. The thickness of the active layer was 100 nm. The heat-resistant protective layers were formed on the active layer at the substrate side and the opposite side thereof in thicknesses of 100 and 200 nm, respectively. Table 7 shows a relationship between the amount of $SiO_2$ added and the minimum laser power required for the crystallization and amorphization. The measurement method was the same as used in EXAMPLE 1.

TABLE 7

| Effect of Addition of $SiO_2$ on ZnSe | | | |
|---|---|---|---|
| Amount of $SiO_2$ (mol %) | Minimum Laser Power (mW) | | Grain Size (nm) |
| | Recording | Erasing | |
| 0 | 9 | 14 | 30 |
| 10 | 9 | 14 | 20 |
| 15 | 7.5 | 13 | 10 |
| 25 | 6 | 12 | 5 |
| 35 | 6 | 11.5 | 5 |
| 50 | 8.5 | 13.5 | <5 |

Table 7 also shows the average grain size of ZnSe observed under a transmission electron microscope. From Table 7 it is seen that the addition of $SiO_2$ to ZnSe allowed the laser power required for the crystallization and amorphization to be reduced and further addition allowed the laser power to be increased again. Thus, it is understood that there is an optimum amount of $SiO_2$ added.

In this example, it is seen that when the amount of $SiO_2$ added was in the range of 15 to 35 mol %, the grain size was less than 10 nm and the laser power required for the crystallization and amorphization was in the range of 6 to 7.5 mW, which was effectively lower than that in the case free of $SiO_2$. (9 mW).

Furthermore, it was found that the heat-resistant protective layer with the above-mentioned mixing ratio can withstand $10^6$ or more recording-erasing cycles, as in EXAMPLE 1.

EXAMPLE 11

A heat-resistant protective layer was provided by the binary-source deposition system on a substrate of polymethyl methacrylate. The heat-resistant protective layer was comprised of a mixture of a zinc chalcogenide such as zinc sulfide (ZnS), zinc selenide (ZnSe) or zinc telluride (ZnTe) with any oxide of glassy germanium dioxide ($GeO_2$), tin oxide ($SnO_2$), indium oxide ($In_2O_3$) and tellurium oxide ($TeO_2$). The mixing ratio of the zinc chalcogenide (ZnX:X is a chalcogen) and the glassy oxide was decided by controlling the evaporated amounts of the respective materials, as in EXAMPLE 1. The quantitative chemical analysis was carried out. The active layer was made of the same TeGeSnO as used in EXAMPLE 1. The thickness of the active layer was 100 nm. The heat-resistant protective layers were formed on the active layer at the substrate side and the opposite side thereof in thicknesses of 100 and 200 nm, respectively.

Table 8 shows a relationship between the amount of the oxide added and the minimum laser power required for the crystallization and amorphization. The measurement method was the same as used in EXAMPLE 1.

The addition of the glassy oxide to the zinc chalcogenide allowed the minimum laser power required for the crystallization and amorphization to be reduced and further addition allowed it to be increased again. From this it is understood that there is an optimum amount of the glassy oxide added.

In this example, when the amount of $SnO_2$ added was in the range of 15 to 35 mol %, the grain size was 10 nm or less, and the laser power required for the crystallization was in the range of 6 to 7 mW, which was lower than that in the case free of the glassy oxide. Furthermore, the laser power required for the amorphization was also reduced. Substantially the same results were obtained for the combinations of the two other zinc chalcogenides and oxides.

TABLE 8

| Effect of Addition of $GeO_2$ to ZnS | | | |
|---|---|---|---|
| Amount of $GeO_2$ (mol %) | Minimum Laser Power (mW) | | Grain Size (nm) |
| | Recording | Erasing | |
| 0 | 9 | 14 | 35 |
| 5 | 9 | 14 | 30 |
| 10 | 7 | 13 | 20 |
| 20 | 6 | 12 | 10 |
| 30 | 6 | 12 | 5 |
| 40 | 7.5 | 13 | <5 |

Table 8 also shows the average grain size of ZnS observed under a transmission electron microscope.

From the examples above, it is concluded that the optical information recording medium according to this invention has an improved characteristics, particularly it is excellent at the points that incident laser power is effectively utilized, that the number of recording-erasing cycles is increased, and that the heat-resistant protective layer of this invention can well protects the active layer from oxidation and hence it is highly reliable.

The explanation of this invention above refers particularly to an application to an optical disk, since this invention is also featured by the structure of the disk. However, the heat-resistant protective layer according to this invention may also be utilized as a passivation membrane using the thermal characteristics thereof, or as a thin film head or thermal printer using an insulation characteristics thereof.

What is claimed is:

1. An optical information recording medium comprising heat resistant protective layers, which are interfaced with a single side or both sides of an active recording layer, all of said layers being formed on a substrate successively layer by layer, and said protective layers consisting of a homogeneously mixed substance consisting of several constituent compounds, wherein at least two of said constituent compounds do not form a solid solution with each other.

2. The optical information recording medium according to claim 1, wherein at least one of said constituent compounds is a non-crystalline glass forming material, and at least one of said constituent compounds is a crystalline material.

3. The optical information recording medium according to claim 1, wherein at least one of said constituent compounds is a metallic crystalline chalcogenide and at least one of said constituent compounds is a glass forming oxide.

4. The optical information recording medium according to claim 3, wherein said metallic crystalline chalcogenide is a zinc chalcogenide and said oxide is a glassy oxide.

5. The optical information recording medium according to claim 4, wherein said zinc chalcogenide is at least one selected from ZnS, ZSe and ZnTe, and said glossy oxide is at least one selected from $SiO_2$, $GeO_2$, $SnO_2$, $In_2O_3$ and $TeO_2$.

6. The optical information recording medium according to claim 3, wherein said metal chalcogenide is a lead chalcogenide and said oxide is glassy.

7. The optical information recording medium according to claim 6, wherein said lead chalcogenide is at least one selected from PbS, PbSe and PbTe, and said glassy oxide is at least one selected from $SiO_2$, $GeO_2$, $SnO_2$, $In_2O_3$ and $TeO_2$.

8. The optical information recording medium according to claim 1, wherein at least one of said compounds is a metal chalcogenide and at least one of said compounds is a nitride.

9. The optical information recording medium according to claim 8, wherein said metal chalcogenide is a zinc chalcogenide and said nitrides is a glassy nitride.

10. The optical information recording medium according to claim 9, wherein said zinc chalcogenide is at least one selected from ZnS, ZnSe and ZnTe, and said nitride is $Si_3N_4$.

11. The optical information recording medium according to claim 1, wherein at least one of said compounds is a metal chalcogenide and at least one of said compounds is a carbide.

12. The optical information recording medium according to claim 11, wherein said metal chalcogenide is a zinc chalcogenide and said carbide is glassy.

13. The optical information recording medium according to claim 12, wherein said zinc chalcogenide is selected from ZnS, ZnSe and ZnTe and said glassy carbide is SiC.

14. The optical information recording medium according to claim 1, wherein at least one of said compounds is a metal chalcogenide, and at least one of said compounds is an oxynitride.

15. The optical information recording medium according to claim 1, wherein a size of the microstructural unit of said protective layer is smaller than a size of the microstructural unit of each of the constituent compounds of said protective layers when said layers are made of said constituent compounds only.

16. The optical information recording medium according to claim 15, wherein at least one of said constituent compounds is a metal chalcogenide, and at least one of said constituent compounds is an oxide.

17. The optical information recording medium according to claim 16, wherein said metal chalcogenide is a zinc chalcogenide and said oxide is glassy.

18. The optical information recording medium according to claim 17, wherein said zinc chalcogenide is at least one selected from ZnS, ZnSe and ZnTe and said glassy oxide is at least one selected from $SiO_2$, $GeO_2$, $SnO_2$, $In_2O_3$ and $TeO_2$.

19. The optical information recording medium according to claim 15, wherein said microstructural unit (grain) has an average grain size of 10 nm or less.

20. The optical information recording medium according to claim 19, wherein said microstructural unit is constituted by at least one selected from ZnS, ZnSe and ZnTe.

* * * * *